United States Patent
Feith et al.

(10) Patent No.: US 7,445,274 B2
(45) Date of Patent: Nov. 4, 2008

(54) COMPOSITE PART, ESPECIALLY CROSS MEMBER

(75) Inventors: Thomas Feith, Korntal-Münchingen (DE); Christian Merkle, Plüderhausen (DE); Walter Wolf, Oppenweiler-Zell (DE)

(73) Assignee: BEHR GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/575,462

(22) PCT Filed: Oct. 14, 2004

(86) PCT No.: PCT/EP2004/011555

§ 371 (c)(1),
(2), (4) Date: Mar. 15, 2007

(87) PCT Pub. No.: WO2005/037632

PCT Pub. Date: Apr. 28, 2005

(65) Prior Publication Data

US 2007/0262617 A1    Nov. 15, 2007

(30) Foreign Application Priority Data

Oct. 14, 2003    (DE)    ................. 103 48 418

(51) Int. Cl.
*B60J 7/00*    (2006.01)
(52) U.S. Cl. ................................. 296/193.02
(58) Field of Classification Search ............ 296/193.02, 296/193.06, 193.07, 208
See application file for complete search history.

(56) References Cited

U.S. PATENT DOCUMENTS

| | | | |
|---|---|---|---|
| 4,610,836 A * | 9/1986 | Wycech | 264/313 |
| 5,354,114 A | 10/1994 | Kelman et al. | |
| 5,658,041 A * | 8/1997 | Girardot et al. | 296/193.09 |
| 6,216,810 B1 | 4/2001 | Nakai et al. | |
| 6,250,678 B1 * | 6/2001 | Yoshinaka et al. | 296/193.02 |
| 6,421,979 B1 * | 7/2002 | Fischer et al. | 52/745.19 |
| 6,503,585 B1 * | 1/2003 | Wagenblast et al. | 428/34.1 |
| 6,601,902 B1 | 8/2003 | Rahmstorf et al. | |
| 6,921,127 B2 * | 7/2005 | Feith et al. | 296/193.02 |
| 7,117,578 B2 | 10/2006 | Schnell | |
| 7,125,466 B2 * | 10/2006 | Cooper et al. | 156/244.14 |
| 7,284,789 B2 * | 10/2007 | Wolf | 296/208 |
| 2007/0052262 A1 * | 3/2007 | Wolf | 296/208 |

(Continued)

FOREIGN PATENT DOCUMENTS

DE    197 53 178 A1    6/1999

(Continued)

*Primary Examiner*—Kiran B. Patel
(74) *Attorney, Agent, or Firm*—Foley & Lardner LLP

(57) ABSTRACT

The invention relates to a composite part, especially a cross member between the A columns of a motor vehicle. Said composite part comprises an open metal profile (2) and a channel (3) disposed therein, at least partially constituted of a plastic material and extending along the metal profile (2). An insert part (4, 22) produced from a plastic material is fastened on the wall of the metal profile (2) in such a manner that a retaining contour (10) configured on an opening (11) in the wall of the metal profile (2) and shaped from said profile undercuts the plastic material of the insert part (4, 22) pressed into the contour, thereby providing the channel (3) with a wall and/or mechanically stabilizing it.

19 Claims, 7 Drawing Sheets

U.S. PATENT DOCUMENTS

Figure 1:
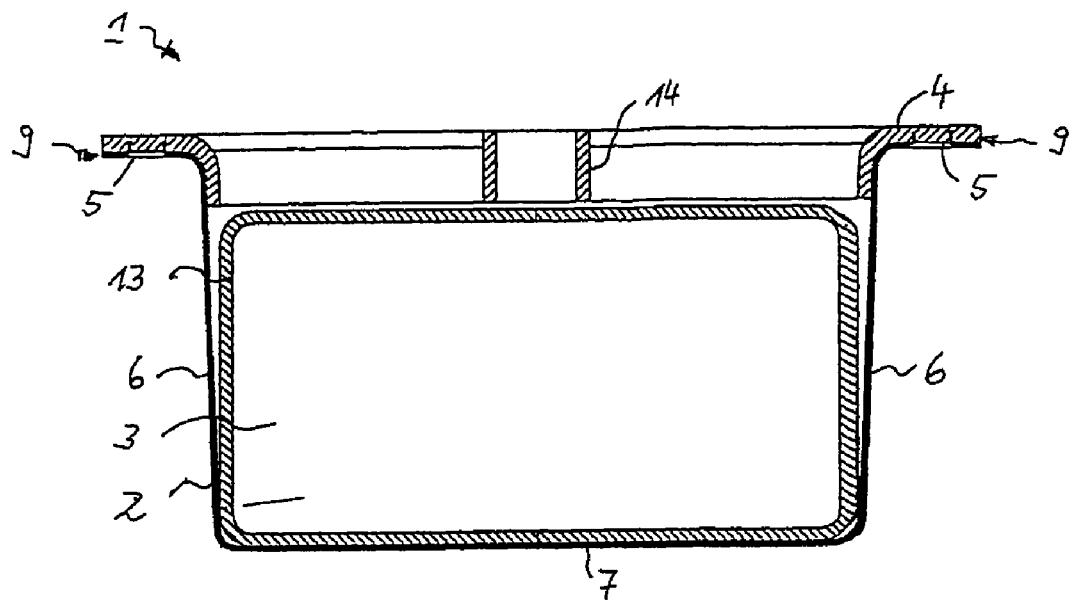

| | | | |
|---|---|---|---|
| 2007/0056748 A1* | 3/2007 | Feith et al. | 166/387 |
| 2007/0132280 A1* | 6/2007 | Wolf | 296/208 |
| 2007/0134452 A1* | 6/2007 | Merkle et al. | 428/34.1 |
| 2007/0194605 A1* | 8/2007 | Merkle et al. | 296/193.02 |

FOREIGN PATENT DOCUMENTS

| | | |
|---|---|---|
| DE | 100 37 374 C1 | 2/2002 |
| DE | 100 64 522 A1 | 3/2002 |
| DE | 100 65 219 C1 | 7/2002 |
| DE | 101 25 559 A1 | 11/2002 |
| FR | 2 783 746 A1 | 3/2000 |
| FR | 2 799 717 A1 | 4/2001 |

* cited by examiner

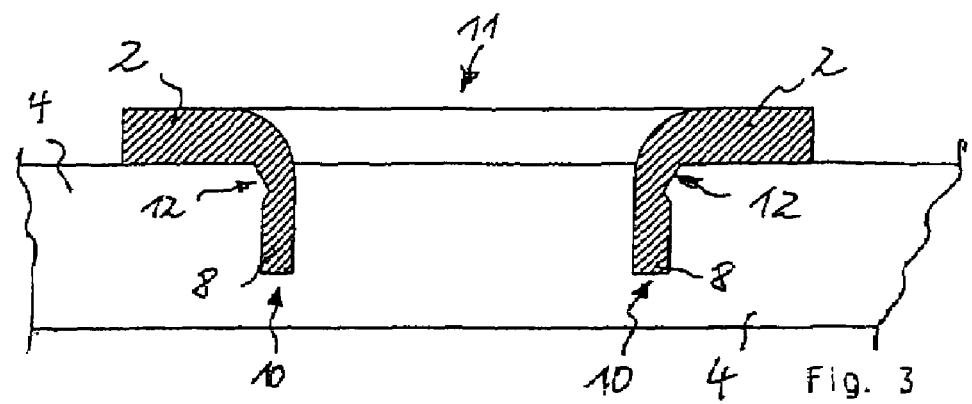
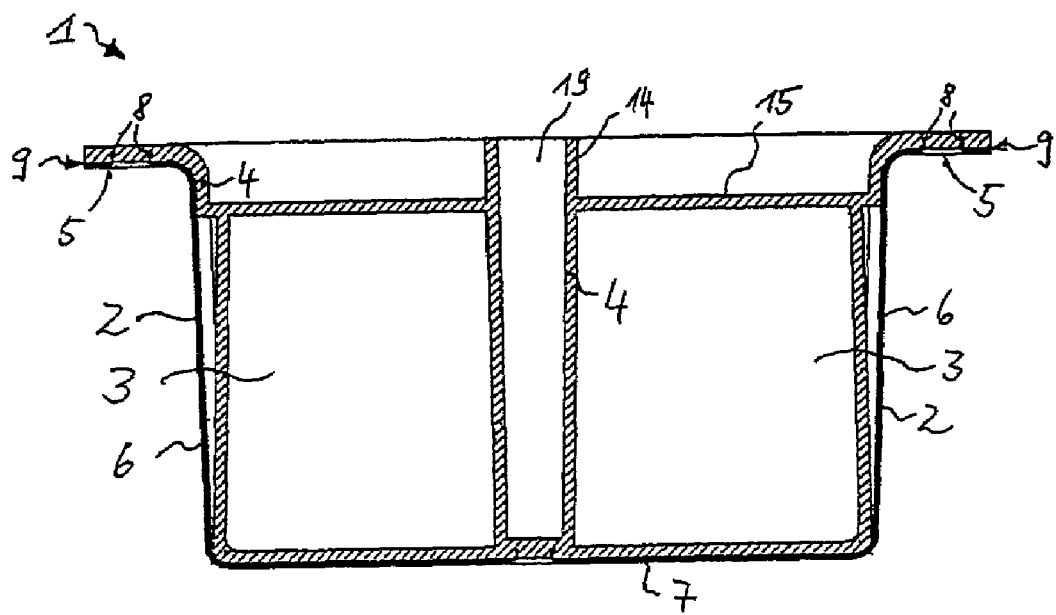

COMPOSITE PART, ESPECIALLY CROSS MEMBER

The invention relates to a composite part, especially a crossmember between the A pillars of a motor vehicle, which is fabricated from metal and plastic. A crossmember in the form of a metal/plastic composite part is known, for example, from DE 100 64 522 A1.

A part which is known from DE 100 64 522 A1 has an essentially tubular base body which is lined on the inside with plastic and thus forms a duct for conducting media, for example air. The plastic is preferably introduced into the base body by means of an injection molding method so that the duct virtually fills the entire hollow section of the base body. The profile of the duct is thus linked to the profile of the section of the base body.

The invention is based on the object of specifying a metal/plastic composite part which comprises a duct which is arranged in a metal section and which can be manufactured in a particularly efficient way while having a large degree of freedom of design with respect to the shape of the duct.

This object is achieved according to the invention by means of a composite part having the features of claim 1. This composite part has an open metal section in which a duct which extends in its direction of extent, especially a venting duct, is arranged. The inner wall of the duct is formed at least mainly from plastic. In order to form at least one wall of the duct and/or to mechanically stabilize the duct, an insertion part which is fabricated at least partially from plastic is provided, said insertion part being attached to the metal section in such a way that a securing contour which is shaped from said metal section, on an opening in the wall of the metal section, undercuts the plastic of the insertion part which is pressed therein. The plastic part is secured in a positively and frictionally locking fashion to the metal part by means of such an attachment, which is also referred to as collar bonding, the securing contour of said metal part being preferably configured as a punched-collar-like elevated portion. Collar bonding is known, for example, from DE 100 65 219 C1 and, as a method of subsequently bonding a hybrid structure made of plastic and metal, it has especially the advantage of a greater degree of design freedom compared to bonding with an injection molding process. The form of the insertion part which is connected to the metal section by collar bonding and which forms a wall of the duct or at least supports it is decoupled from the profile of the metal section. This easily provides the possibility of adapting the cross section of the duct to the respective requirements, and especially varying it in the longitudinal direction of the metal section. The force-transmitting connection between the metal and plastic components permits particularly lightweight and at the same time stable shaping of the composite part. Further advantages are provided by the fact that the tolerance requirements made of the metal section and of the injection molding tool for manufacturing the insertion part are less than when the metal and plastic components of the hybrid part are bonded with an injection molding process. In addition, it is not necessary to anticipate distortion problems when manufacturing the composite part.

The metal section is formed, for example, as a U or omega section. In a particularly preferred embodiment, a hat section is used which permits both particularly simple insertion of a prefabricated insertion part into the metal part and is highly suitable for attaching the insertion part by means of collar bonding.

According to a first embodiment, part of the wall of the duct, specifically at least the wall of the duct which faces the open side of the metal section, is formed by the insertion part. The other walls of the duct are preferably formed here by a second plastic part which is bonded or injection molded into the metal section, for example.

According to a second embodiment, a prefabricated duct is arranged as a second plastic part in the metal section and attached or at least stabilized therein by the insertion part. The insertion part on the one hand and the additional plastic part on the other are preferably fabricated from different materials both according to the first and to the second exemplary embodiments, the material of one insertion part typically having to fulfill more stringent requirements with respect to the mechanical strength.

According to a third embodiment, no further plastic part in addition to the insertion part is provided inside the metal section. The duct which is prefabricated completely and is formed by the insertion part is attached directly to the metal section here by collar bonding. The duct is manufactured, for example, by bonding, welding or clipping a plurality of plastic parts.

In each of the aforesaid embodiments, the metal section and/or the duct can be additionally reinforced by an additional insertion part made of metal or by an insertion part made of a metal/plastic composite. Furthermore, foamed plastics can be used as a component of the insertion part and/or as other components of the composite part. Said plastics have both the advantages of low weight and a favorable relation between weight and mechanical stability as well as particularly good noise-damping and/or insulating, especially thermally insulating, properties. For example, multi-component injection molded parts can also be used depending on the function of the respective parts.

The insertion part which is arranged in the metal part preferably has a rib structure for increasing the mechanical stability. Here, the insertion part can either form part of the wall of the duct or be Arranged outside of the duct. In all cases, the rib structure is arranged at least partially, preferably completely, inside the metal section. The rib structure is particularly advantageously used at the same time to separate a plurality of cross-sectional areas from one another within the cross section of the metal section. In this context, for example, each of the individual cross-sectional areas forms a duct for a medium, for example air or a fluid. Alternatively, at least one of the ducts and/or a space which is formed between the ducts which are spaced apart from one another can be used as a cable duct. Reinforcing structures made of metal, plastic or a metal/plastic composite may be connected to the metal section by, for example, welding, bonding, clinching or in some other way. Web sheet-metal elements, foam structures or combinations of such structures are suitable for preventing dents in the thin-walled metal section or inserted plastic sections.

The advantage of the invention is especially that any desired spatial profile of a venting duct which is fabricated completely or partially from plastic can be implemented within a section made of metal in an efficient way which is appropriate for the loading by subsequently bonding prefabricated metal and plastic parts.

Figure 2:
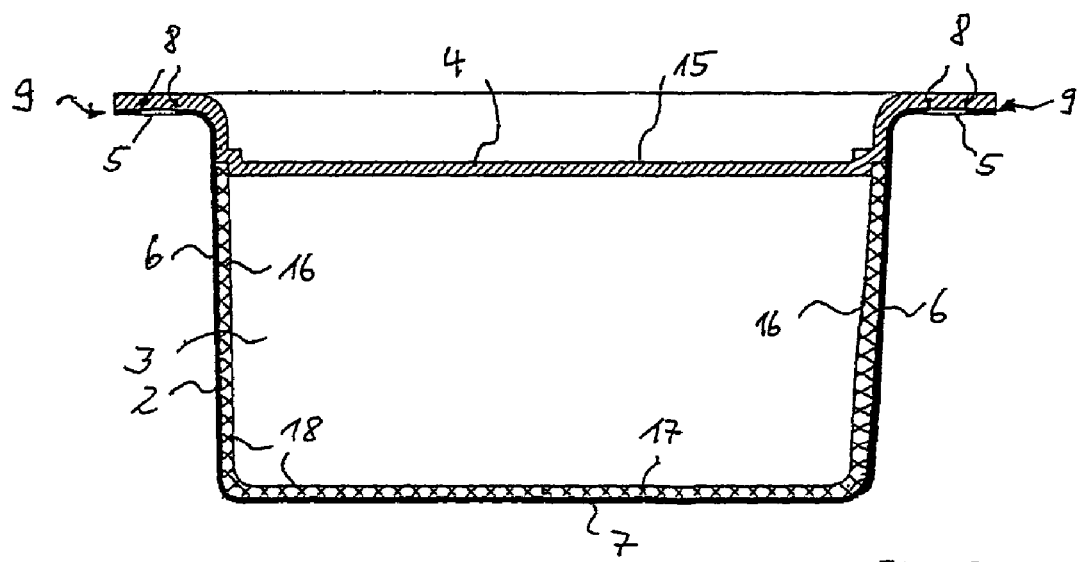
Figure 5:
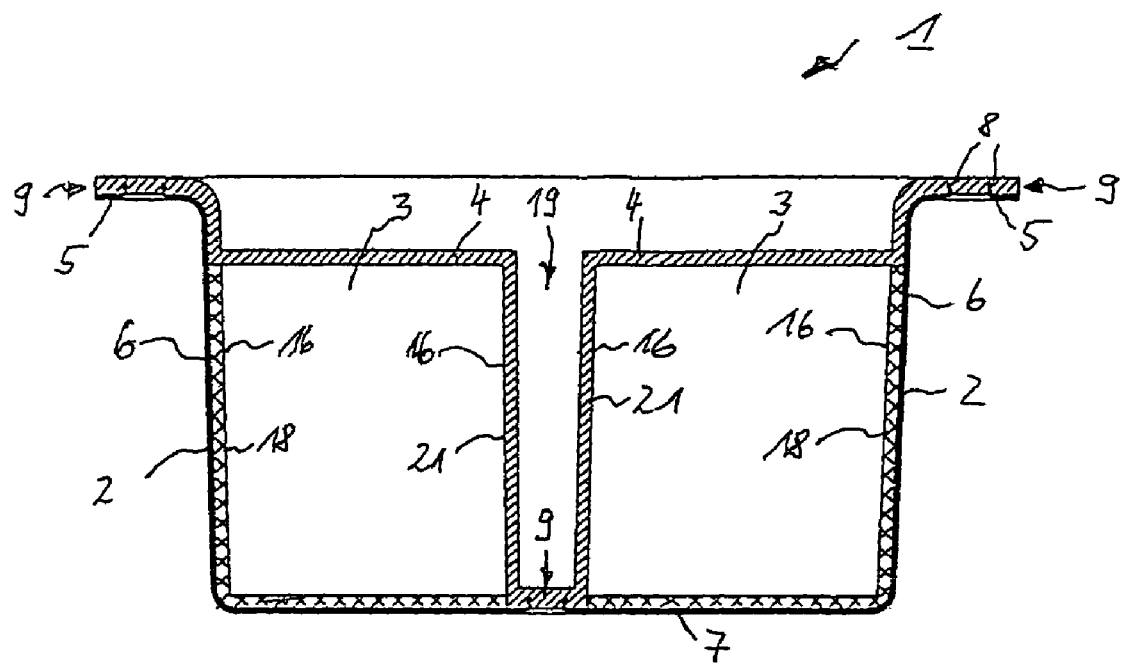
Figure 6:
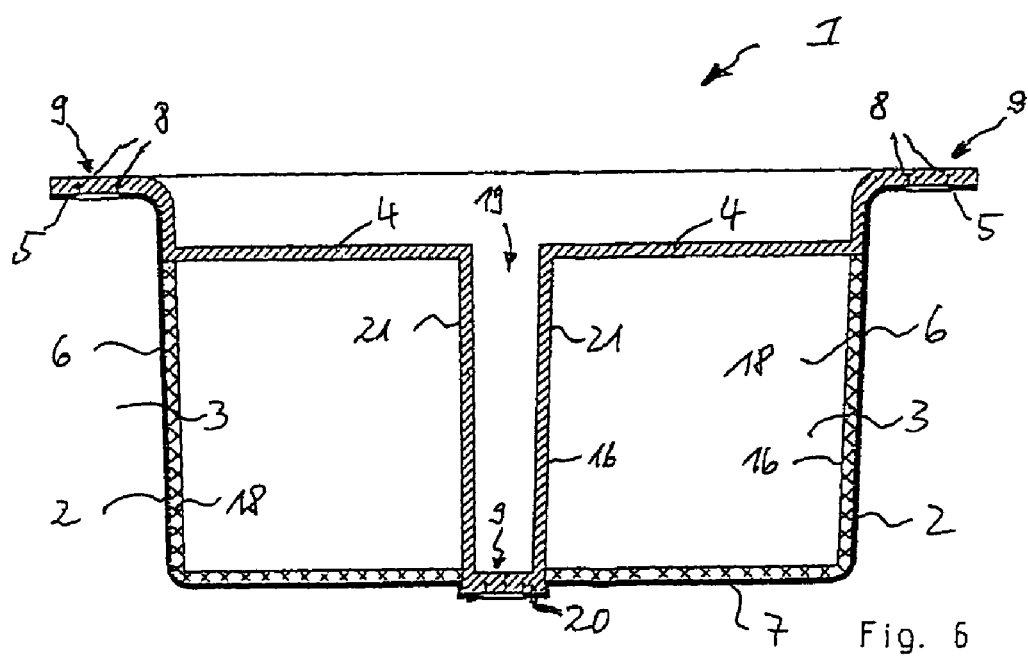
Figure 7:
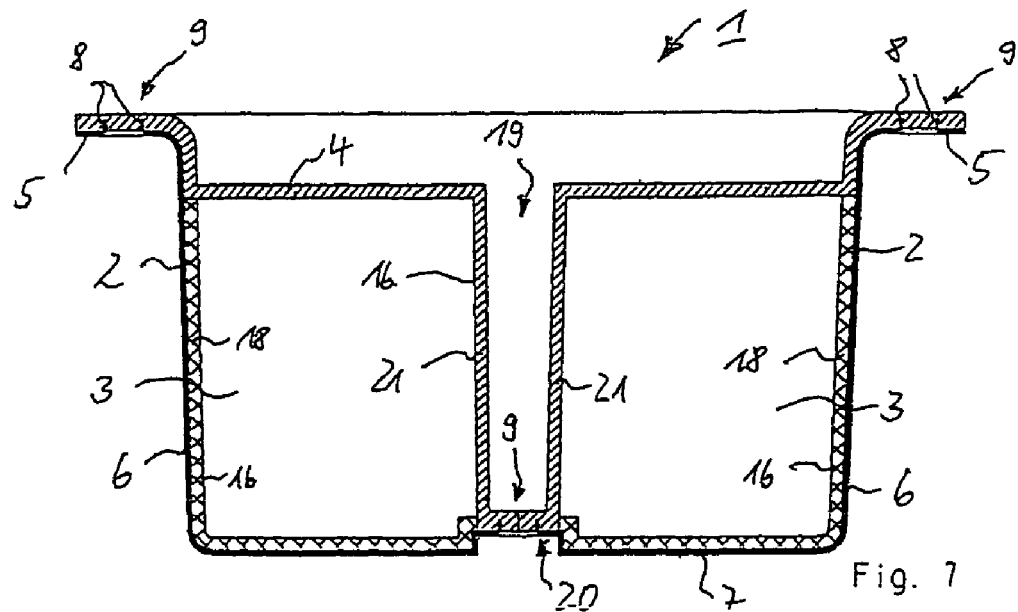
Figure 8:
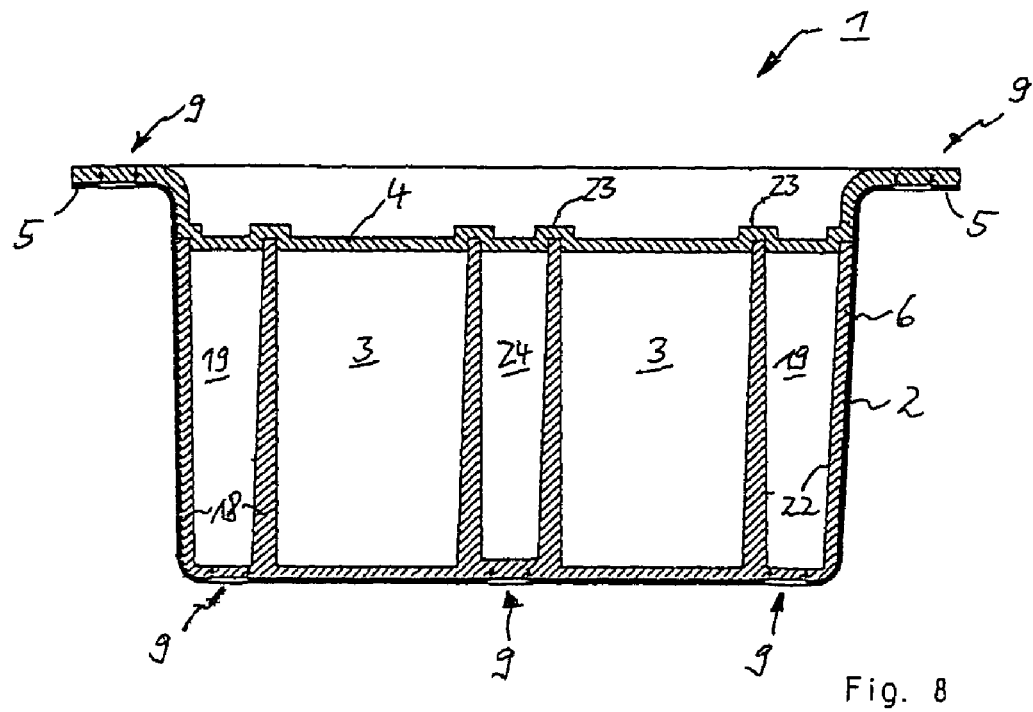
Figure 8A:
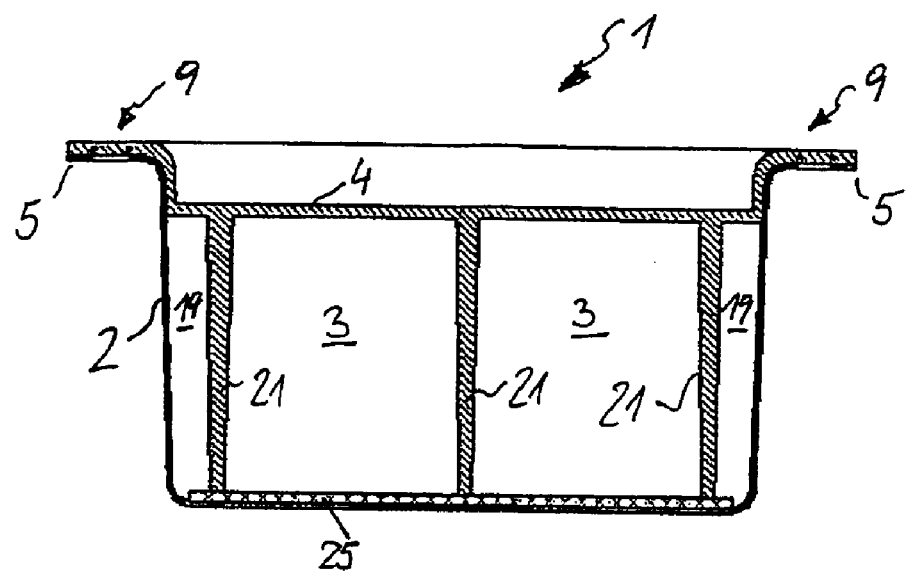
Figure 9:
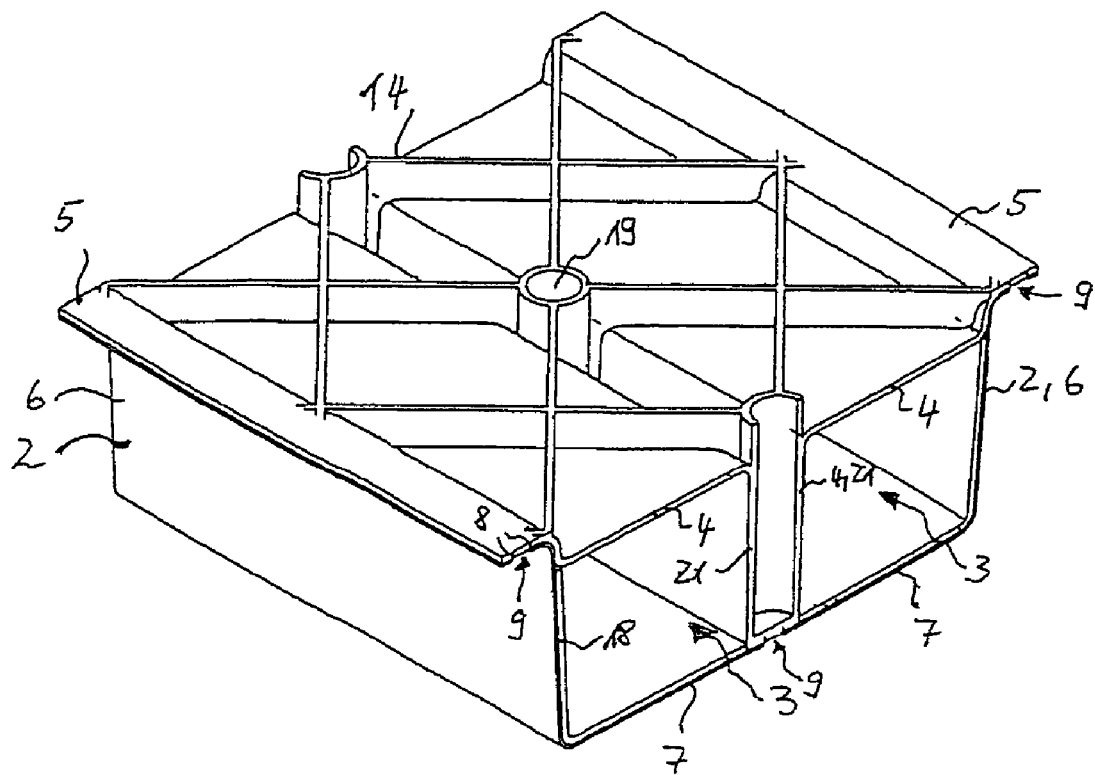
Figure 10A:
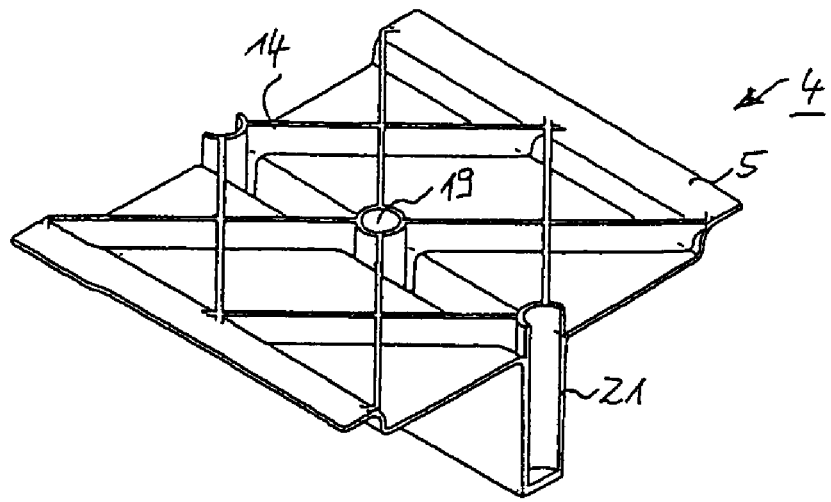
Figure 10B:
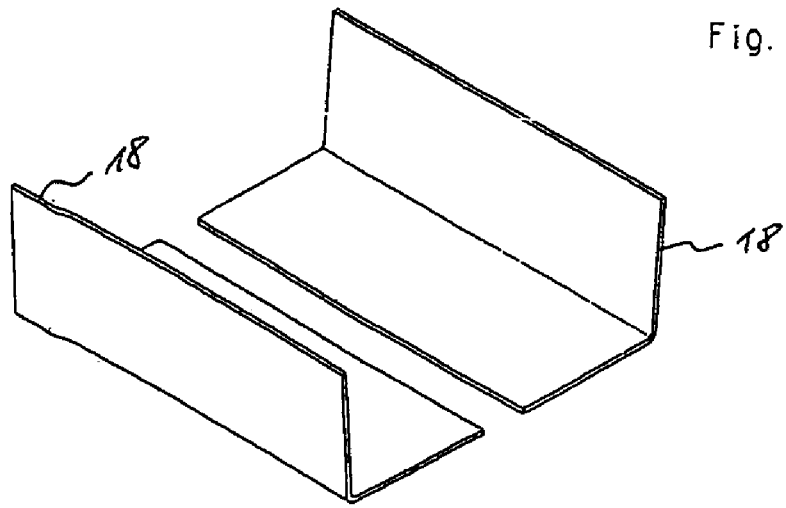
Figure 10C:
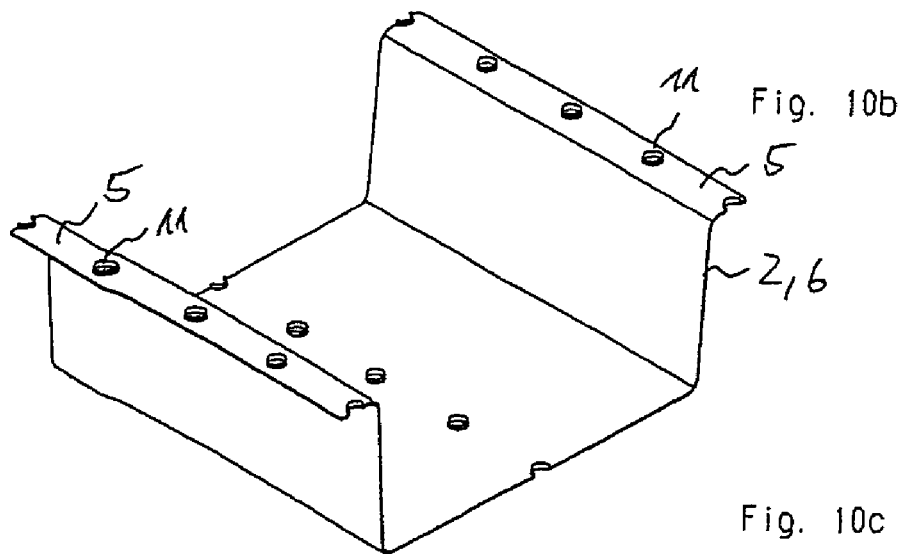
Figure 11:
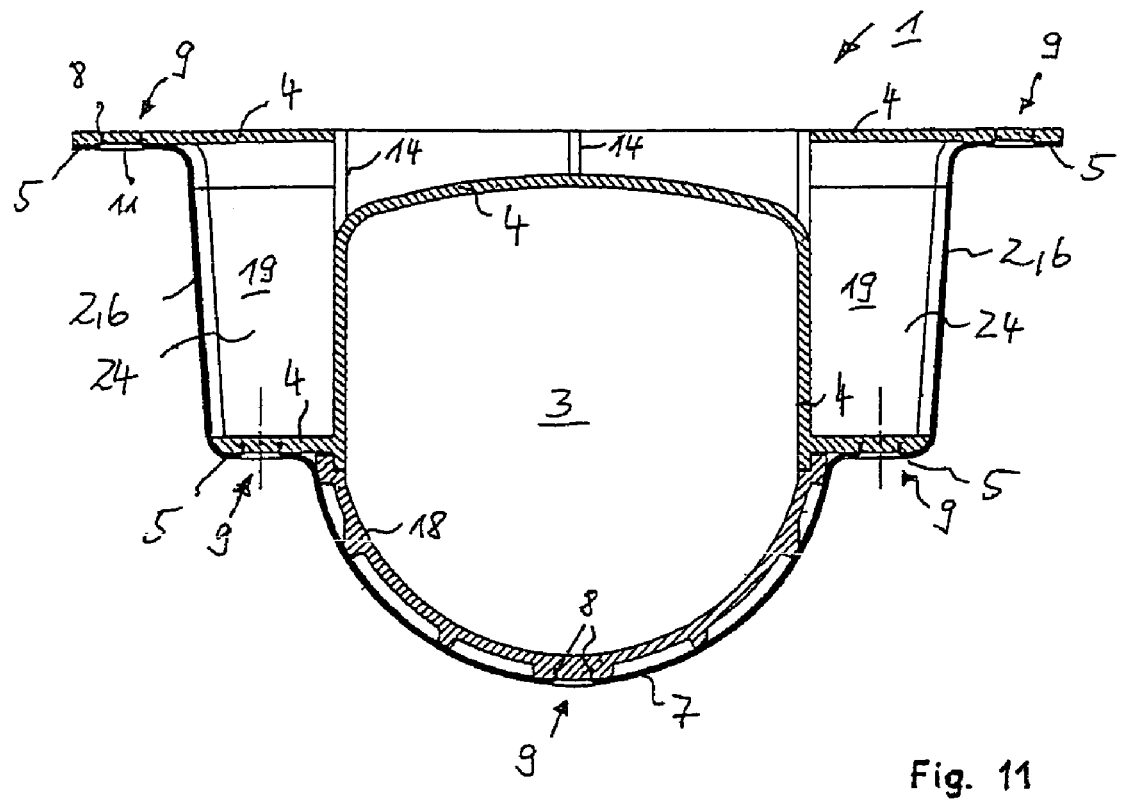
Figure 11A:
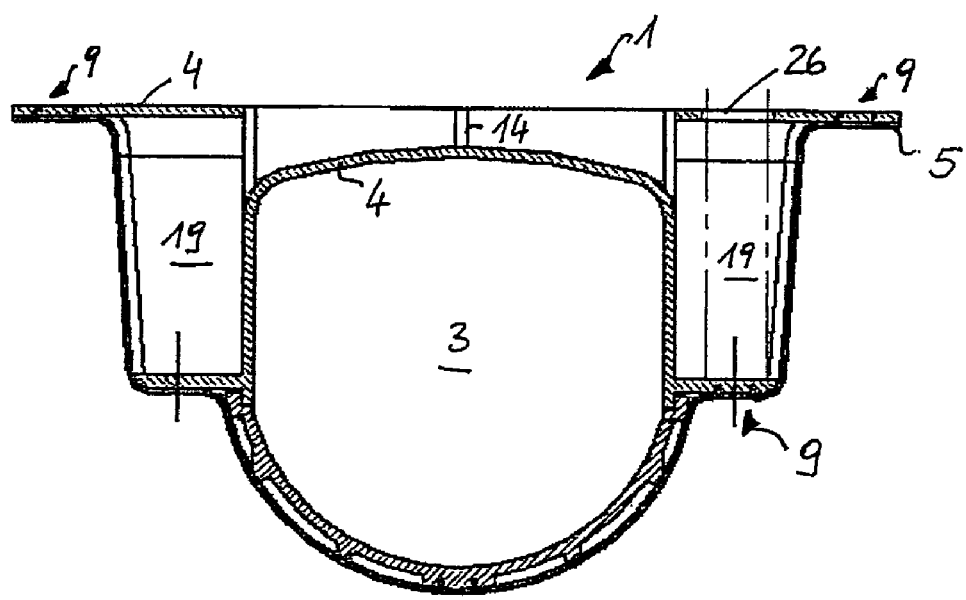

A plurality of exemplary embodiments of the invention will be explained in more detail below with reference to a drawing, in which, in each case in a schematic cross-sectional illustration:

FIGS. 1, 2 each show an exemplary embodiment of a composite part with a metal section and a duct arranged therein, FIG. 3 shows the attachment of a plastic part to a metal part by means of collar bonding, FIGS. 4 to 7 each show an exemplary embodiment of a composite part with two ducts, FIG. 8 shows a composite part with two ducts and three additional cavities, FIG. 8a shows a composite part with two ducts and an additional insertion part, FIG. 9 shows a composite part with two ducts in a perspective illustration, FIGS. 10a to 10c show the composite part according to FIG. 9 in its individual elements, FIG. 11 shows a composite part with a circular duct, and FIG. 11a shows a composite part with a circular duct which is sectioned with an offset.

Parts which correspond to one another or have the same effect are provided with the same reference symbols in all the figures.

All the exemplary embodiments relate to a composite part 1 which comprises an open metal section 2 in the form of a hat section and is arranged as a crossmember between the A pillars of a motor vehicle. Joints or securing elements for an instrument panel or installations in a cockpit module are located on the metal section 2 and are not illustrated. Within the metal section 2 there is at least one duct 3 which serves to conduct air into the passenger compartment of the motor vehicle. The composite part 1 also comprises an insertion part 4 which is fabricated from plastic and is inserted using the PMA (post mold assembly) method, said insertion part 4 forming at least part of the wall of the duct 3 and/or increasing its stability. The subsequent statements refer, unless indicated otherwise, both to the simple embodiments according to FIGS. 1 and 2 and to the developments according to FIGS. 4 to 8.

The metal section 2 which comprises two edge sections 5, two side sections 6 and a base area 7 has punched-collar-like elevated portions 8 at least at the edge sections 5, to which elevated portions 8 the insertion part 4 is attached in a frictionally and positively locking fashion. This type of attachment is also referred to as collar bonding and is known in principle from DE 100 65 219 C1. The insertion part 4 is fabricated, for example, by plastic injection molding. The tolerance requirements both of the metal section 2 and of the insertion part 4 are relatively low here especially compared to the manufacture of a metal/plastic composite part using an injection molding process (IMA, in mold assembly). Furthermore, virtually no problems due to distortion are to be anticipated. The joints 9 which are formed on the elevated portions 8 between the metal section 2 and the insertion part 4 contribute overall to increased stability of the composite part 1.

The attachment of the insertion part 4 to the metal section 2 will be explained in more detail below with reference to FIG. 3. The elevated portion 8 forms a securing contour 10 which is bent out from the metal section 2 and has a circular shape in plan view of the surface of the metal section 2, only a detail of an opening 11 in the metal section 2 being shown in FIG. 2. The punched-collar-like elevated portion 8 into which the insertion part 4 is pressed is shaped in cross section in such a way that an undercut 12 is produced which contributes to a particularly stable and reliable attachment of the insertion part 4 made of plastic to the metal section 2. The undercut 12, also referred as a constriction of the elevated portion 8, is generated by stamping a circular groove into the flat surface of the metal section 2 before the collar is manufactured.

In the exemplary embodiment according to FIG. 1, the duct 3 is formed by a rectangular section 13 made of plastic which is inserted into the metal section 2. The rectangular section 13 which rests on the base area 7 and at least partially on the side sections 6 is secured in the metal section 2 by the insertion part 4 which has a rib structure 14 for the purpose of reinforcement. Despite a relatively resilient plastic, from which the channel 3 is fabricated, compared to the material of the insertion part 4, said duct 3 is enclosed in the metal section 2 in a dimensionally stable fashion. In the illustrated cross section, the duct 3 virtually completely fills the cross section formed from the metal section 2. In contrast to this it is possible for the duct 3 to taper in cross-sectional areas (not illustrated) of the composite part 1 in order to form additional space for further installations inside the metal section 2. Likewise, various composite parts 1 can easily be fabricated on the basis of metal sections 2 of the same type, with ducts 3, especially venting ducts, which are shaped in different ways.

In the exemplary embodiment according to FIG. 2, a cover 15 of the duct 3, said cover lying opposite the base area 7 and being arranged at the top of the illustration, is formed by the insertion part 4, while sidewalls 16 which adjoin the side sections 6 of the metal section 2 and a base surface 17 which adjoins the base area 7 of the metal section 2 is formed by a lining 18 made of plastic. The lining 18, as a further plastic part, is bonded into the metal section 2 or injection molded or foamed with an injection molding method here. Overall, the entire inner surface of the duct 3 is formed from plastic, as in the exemplary embodiment according to FIG. 1.

FIGS. 4 to 7 each show an exemplary embodiment of a composite part 1 which has two ducts 3 and a free space 19 which is arranged between them. In the exemplary embodiment according to FIG. 4, the insertion part 4 including the ducts 3 is formed in one piece, while in the exemplary embodiments according to FIGS. 5 to 7 the ducts 3 are each partially formed by the insertion part 4 and partially by the lining 18. In each embodiment according to FIGS. 4 to 7, joints 9 are provided both on the edge sections 5 of the metal section 2 and centrally in the region of the base area 7. In the exemplary embodiments according to FIGS. 6 and 7, the centrally arranged joints 9 are located on an outwardly or inwardly directed groove 20 in the metal section 2, said groove 20 contributing to a further increase in the stability of the composite part 1. The sidewalls 16 of the ducts 3 which adjoin the centrally arranged joints 9 are also referred to as webs 21. The webs 21 do not necessarily extend parallel to the side sections 6 of the metal section 2 but can alternatively have a round shape in a plan view in the direction of the base area 7 and thus be arranged as individual columns in the duct 3. A die, which when necessary can support the corresponding bonding forces during collar bonding, dips into this area.

In contrast to the exemplary embodiments explained above, the webs 21 in the exemplary embodiment according to FIG. 8 are not formed by the insertion part 4 which is attached to the edge sections 5 but rather by a further insertion part 22 which is attached exclusively to the base area 7. Both insertion parts 4, 22 are prefabricated and are subsequently attached to the metal section 2 using the PMA method by means of collar bonding. In order to secure the webs 21 of the insertion part 22 which adjoin the base area 7, the insertion part 4 which is the upper one in the illustration has four grooves 23 or hollow cylinders which extend in the longitudinal direction of the metal section 2. In each case a free space 19, which can be used as a cable duct 24, is formed between the side sections 6 and the ducts 3 as well as between the two ducts 3.

An alternative to the composite part 1 illustrated in FIG. 8 is shown by FIG. 8a. The insertion part 4 which is attached to the edge sections 5 has webs 21 which abut against a further insertion part 25 which is located on the base area 7. The insertion part 25 has corresponding grooves for receiving and, if appropriate, securing the webs 21. Alternatively, the insertion part 25 can be constructed from an elastic material, for example from an elastomeric plastic or from rubber so that in the assembled state the webs rest against it, or are secured, in a seal-forming way, the seal-forming abutment being brought about, especially, by slightly pressing the elastic material in by means of the webs 21. The insertion part 4 is prefabricated and is attached to the metal section 2 subsequently using the PMA method by means of collar bonding, in which case the insertion part 25 can preferably also be attached to the metal section in the way indicated.

FIG. 9 shows a composite part 1 with two ducts 3 in a perspective illustration. The insertion part 4 has the rib structure 4 for the purpose of reinforcement. The joints 9 are provided at the edge sections 5 of the metal section 2 and centrally in the region of the base area 7. The individual elements—the insertion part 4, the lining 18, the metal section 2—of the composite part 1 according to FIG. 9 are shown separately in a perspective illustration in FIGS. 10a to 10c.

FIG. 11 shows an alternative exemplary embodiment of a composite part 1 with a circular duct 3. To the side of the duct 3, free spaces 19 are formed which can be used as a cable duct 24. The composite part 1 has a two-stage round section 5 of the metal section 2. The respective round section 5 is provided here with elevated portions 8 on which joints 9 for increasing the stability are formed. A further joint 9 is provided centrally in the region of the base area 7.

FIG. 11a shows a composite part 1 which corresponds to the preceding exemplary embodiment in an offset sectional illustration, the section in the half illustrated on the right in the region of the lateral, lower joints 9 and in the half illustrated on the left extending offset with respect to the latter. The insertion part 4 advantageously has a cutout 26 in the region above the lateral, lower joints 9. Said cutout 26 may serve, for example, as an opening for introducing a tool which is necessary for the bonding process, for example a die.

LIST OF REFERENCE NUMERALS

1 composite part
2 metal section
3 duct
4 insertion part
5 edge section
6 side section
7 base area
8 elevated portion
9 joint
10 securing contour
11 opening
12 undercut
13 rectangular section
14 rib structure
15 cover
16 sidewall
17 base surface
18 lining
19 free space
20 groove
21 web
22 insertion part
23 groove
24 cable duct
25 insertion part
26 cutout

The invention claimed is:

1. A composite part, especially a crossmember between A-pillars of a motor vehicle, having an open metal section and a duct which is arranged therein, is formed at least partially from plastic and extends along the metal section, wherein, in order to form a wall and/or mechanically stabilize the duct, an insertion part which is fabricated at least partially from plastic is attached to the wall of the metal section in such a way that a securing contour which is shaped from said metal section, on an opening in the wall of the metal section, undercuts the plastic of the insertion part which is pressed therein.

2. The composite part as claimed in claim 1, wherein the securing contour is embodied as a punched-collar-like elevated portion of the metal section.

3. The composite part as claimed in claim 1, wherein the metal section is embodied as a hat section.

4. The composite part as claimed in claim 1, wherein a further plastic part for forming at least part of the wall of the duct.

5. The composite part as claimed in claim 1, wherein the insertion part has a reinforcing rib structure.

6. The composite part as claimed in claim 1, wherein the duct only partially fills the metal section.

7. The composite part as claimed in claim 6, wherein a plurality of ducts are arranged inside the metal section.

8. The composite part as claimed in claim 6, wherein a cable duct is arranged inside the metal section.

9. The composite part as claimed in claim 2, wherein the metal section is embodied as a hat section.

10. The composite part as claimed in claim 2, wherein a further plastic part for forming at least part of the wall of the duct.

11. The composite part as claimed in claim 3, wherein a further plastic part for forming at least part of the wall of the duct.

12. The composite part as claimed in claim 2, wherein the insertion part has a reinforcing rib structure.

13. The composite part as claimed in claim 3, wherein the insertion part has a reinforcing rib structure.

14. The composite part as claimed in claim 4, wherein the insertion part has a reinforcing rib structure.

15. The composite part as claimed in claim 2, wherein the duct only partially fills the metal section.

16. The composite part as claimed in claim 3, wherein the duct only partially fills the metal section.

17. The composite part as claimed in claim 4, wherein the duct only partially fills the metal section.

18. The composite part as claimed in claim 5, wherein the duct only partially fills the metal section.

19. The composite part as claimed in claim 7, wherein a cable duct is arranged inside the metal section.

* * * * *